UNITED STATES PATENT OFFICE 2,135,008

WATER-INSOLUBLE AZO DYESTUFFS

Helmut Kleiner, Cologne-Mulheim, Otto Bayer, Leverkusen-I. G. Werk, and Wilhelm Kunze, Frankfort-on - the - Main - Fechenheim, Germany, assignors to General Aniline Works, Inc., New York, N. Y., a corporation of Delaware No Drawing. Application March 18, 1936, Serial No. 69,588. In Germany March 22, 1935

5 Claims. (Cl. 260—207)

The present invention relates to new water insoluble azodyestuffs suitable for dyeing cellulose esters, such as cellulose acetate silk, and to the materials dyed therewith, more particularly the invention relates to water insoluble azodyestuffs which may be represented by the general formula:

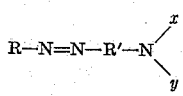

wherein R stands for the radical of a diazotized aromatic amine, bearing as substituent at least one esterified carboxylic acid group, and wherein R' stands for an aromatic radical, which has been coupled in para position to

$x$ stands for a mono- or polyhydroxyalkyl group, which may be etherified or esterified, and which may be attached to R' in ortho position to the nitrogen atom, and $y$ stands for hydrogen, alkyl or hydroxyalkyl. As diazotization components there may be mentioned by way of example amines of the benzene series, bearing at least once as substituent an esterified carboxylic acid group, such as an alkyl ester, hydroxyalkyl ester, alkoxyalkyl ester, a phenyl ester, a benzyl ester, and which may bear further substituents, such as halogen, the nitro group, a hydroxy group, which may be esterified or etherified, it being understood that the free sulfonic acid or the free carboxylic acid group is excluded. As coupling components there are mentioned by way of example mono- or polyhydroxyalkyl substituted aromatic amines of the benzene or naphthalene series, including such amines in which the nitrogen atom forms part of a ring system, especially of a six-membered ring system, such as a tetrahydrobenzoquinoline compound, the said coupling component being capable of further substitution in the manner indicated above.

The dyestuffs obtained in this manner are especially suited for the dyeing of cellulose esters, such as acetate artificial silk, and it is useful to employ them with the addition of a dispersing agent. The dyeings obtained with these dyestuffs are distinguished from such obtained with analogous dyestuffs, which contain no carboxylic acid ester groups, by an improved fastness to washing and to water, and, especially when the ester group stands in para position to the azo group, by a distinct deepening of color. Moreover the dyeings obtained with the new dyestuffs can be discharged to a pure white.

The invention is illustrated by the following examples, without being restricted thereto:

*Example 1.*—165 parts by weight of p-amino benzoic acid ethyl ester are diazotized with 69 parts by weight of nitrite, and the diazotization mixture is added to a hydrochloric acid solution of 195 parts by weight of dihydroxy ethyl m-toluidine. Neutralization is effected with sodium acetate and, as soon as the coupling is complete, the solution is rendered alkaline with sodium carbonate. The dyestuff, having the following formula:

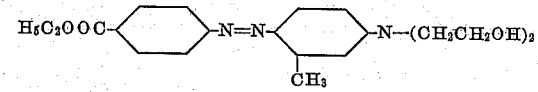

is filtered with suction, washed, pasted with a dispersing agent and dried under mild conditions. It is a brick-red powder dyeing acetate artificial silk vivid orange shades, which can be discharged to a pure white.

The analogous dyestuff without the ester group dyes acetate artificial silk yellow shades, and is distinctly inferior as regards fastness to washing and water.

By using instead of the ethyl ester of the p-amino benzoic acid the corresponding methyl or n-butyl ester, dyestuffs of similar properties are obtained.

*Example 2.*—165 parts by weight of p-amino benzoic acid ethyl ester are diazotized, as described in Example 1, and the diazotization mixture is added to 252 parts by weight of the hydrochloric acid salt of 3,7-dihydroxy-tetrahydrobenzoquinoline of the formula:

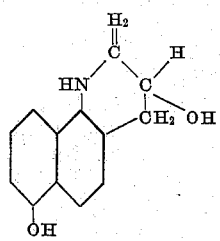

dissolved in water. Coupling begins at once with separation of the dyestuff formed and is quickly complete after the addition of sodium acetate. The dyestuff, worked up as described in Example 1, corresponds to the following formula:

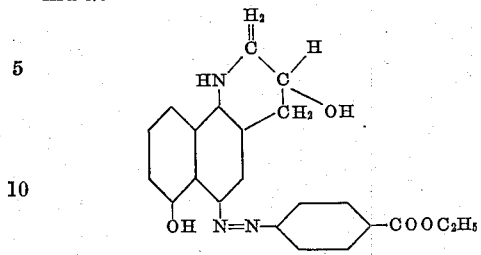

It is a violet black powder and dyes acetate artificial silk clear and bluish violet shades, which can be discharged to a pure white.

The corresponding dyestuff without the ester group only dyes acetate artificial silk ruby-red, and is inferior to the above dyestuff as regards washing, fastness to water, and dischargeability.

Example 3.—209 parts by weight of aniline-2,4-dicarboxylic acid dimethyl ester are diazotized in a suspension of aqueous hydrochloric acid with 69 parts by weight of nitrite, whereby the whole passes into solution. There is then added thereto a solution of 195 parts by weight of 1-dihydroxyethylamino-3-methyl benzene in dilute hydrochloric acid, neutralization is effected with sodium acetate, and, after the coupling is complete, the solution is rendered alkaline with sodium carbonate. The dyestuff separated is filtered with suction, washed, pasted with a dispersing agent, and carefully dried. It corresponds to the following formula:

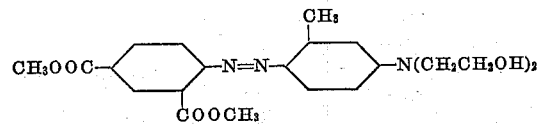

and forms a dark red powder, which dyes acetate artificial silk reddish orange shades. The dyeings can be discharged to a pure white. They have a deeper shade than those obtained with the dyestuff from the corresponding aniline monocarboxylic acid ester.

Example 4.—210 parts by weight of 3-nitro-4-amino-1-benzoic acid ethyl ester are dissolved in some glacial acetic acid, and concentrated hydrochloric acid in the quantity necessary for the diazotization is added. The diazotization is effected with 69 parts by weight of nitrite, and the solution is diluted with ice water. After the filtration, a solution of 181 parts by weight of dihydroxy ethyl aniline in dilute hydrochloric acid is added, and neutralization is effected with sodium acetate. After the coupling is complete, the dyestuff, which corresponds to the following formula:

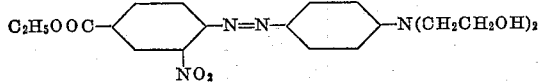

is separated and worked up in the usual manner. It dyes acetate artificial silk yellowish red shades, which can be discharged well.

The corresponding dyestuff without ester group only dyes orange, and is, in washing and in fastness to water, distinctly inferior.

Example 5.—181 parts by weight of 4-aminobenzoic acid glycolmonoester are diazotized in a hydrochloric acid in the usual manner with a solution of 69 parts by weight of sodium nitrite. The clear diazo solution thus obtained is coupled with a hydrochloric acid solution of 125 parts by weight of dihydroxyethylaniline. The hydrochloric acid is neutralized with sodium acetate, whereby the formation of the dyestuff is completed. The dyestuff corresponding to the following formula:

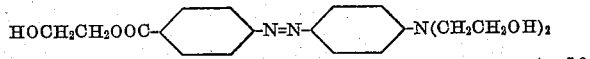

is isolated by filtering with suction from the acetic acid solution. It can be pasted with the usual dispersing agents and dyes acetate artificial silk vivid yellowish-orange shades of good fastness properties, which can be discharged to a pure white.

When using for example hydroxyethylmethylaniline, hydroxyethyl-m-toluidine, or N-hydroxyethyl-m-toluidine as coupling components, dyestuffs of similar shades and qualities are obtained.

Example 6.—195 parts by weight of 4-aminobenzoic acid-β-methoxyethylester $$(H_2NC_6H_4COOCH_2CH_2OCH_3)$$

are diazotized in the usual manner with 69 parts by weight of sodium nitrite and coupled with a hydrochloric solution of 155 parts by weight of hydroxyethylmethylaniline. Coupling begins already in the hydrochloric acid solution and is completed by neutralizing with sodium acetate. The dyestuff corresponding to the following formula:

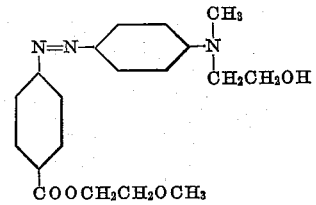

is filtered with suction and washed. When pasted with a dispersing agent it yields on acetate artificial silk strong yellowish-orange shades of good fastness properties.

Example 7.—210 parts by weight of 4-aminobenzoic acid-glycerinmonoester $$(H_2NC_6H_4COOCH_2CHOHCH_2OH)$$

are dissolved in acetate and aqueous hydrochloric acid, diazotized with 69 parts by weight of sodium nitrite and coupled with a hydrochloric solution of 200 parts of tetrahydro-3-hydroxybenzoquinoline. The dyestuff corresponding to the following formula:

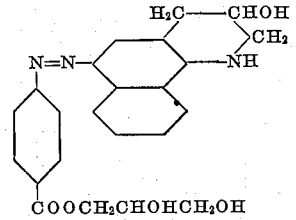

is separated from the acetic acid solution and pasted with a dispersing agent; it yields on acetate artificial silk strong pink shades.

Example 8.—226 parts by weight of 3-nitro-4-aminobenzoic acid-glycolester are dissolved in glacial acetic acid and a sufficient quantity of concentrated hydrochloric acid, diazotized with 69 parts by weight of sodium nitrite and thinned with ice water. The diazo solution is filtered and coupled with a hydrochloric solution of 155 parts by weight of hydroxyethylmethylaniline. The dyestuff, which corresponds to the following formula:

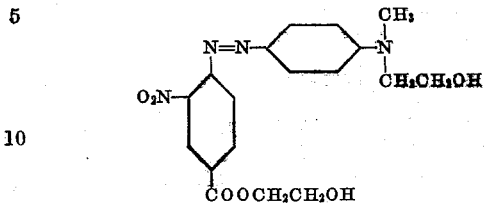

is worked up and pasted with a dispersing agent. It yields on acetate artificial silk vivid and strong yellowish-red shades of good fastness properties.

When using 5-nitro-2-aminobenzoic acid glycolester, a dyestuff of a similar shade is obtained; when using 3-methoxy-4-aminobenzoic acid glycolester or 4-amino-2-chlorobenzoic acid glycolester, a yellowish orange dyeing more strongly is obtained, which has good fastness properties and can be discharged to a pure white.

The following table contains a number of further combinations manufactured according to the process, and their shades on acetate artificial silk:

| Diazotizing components | Coupling components | Shade |
| --- | --- | --- |
| p-Aminobenzoic acid-n-butyl-(or ethyl-)ester | Dihydroxyethyl-m-toluidine | Orange. |
| Do | Dihydroxy-ethyl aniline | Do. |
| Do | Dihydroxyethyl-m-chloraniline | Do. |
| Do | Hydroxyethyl-methylaniline | Do. |
| Do | n-Hydroxyethyl-butyl-m-toluidine | Do. |
| Do | Hydroxyethyl-p-cresidine | Reddish orange. |
| Do | Dihydroxyethyl-p-cresidine | Do. |
| Do | n-Hydroxyethyl-butyl-p-cresidine | Do. |
| Do | 3 - hydroxytetrahydrobenzoquinoline of the formula: 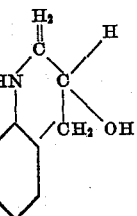 | Bluish pink. |
| m-Aminobenzoic acid ethyl ester | Dihydroxyethyl-m-toluidine | Reddish yellow. |
| Do | Dihydroxyethyl-m-chloraniline | Do. |
| Do | 3,7 - dihydroxytetrahydrobenzoquinoline. | Bluish red. |
| o-Aminobenzoic acid ethyl ester | Dihydroxyethyl-m-toluidine | Reddish yellow. |
| Do | 3,7 - dihydroxytetrahydrobenzoquinoline. | Reddish violet. |
| 3.5-dinitro-2-amino-benzoic acid-n-butyl-(or ethyl-)ester | Dihydroxyethyl-m-toluidine | Ruby. |
| Do | Dihydroxyethyl-m-chloraniline | Wine red. |
| 1-amino-2.4-dicarboxylic acid dimethylester | Dihydroxyethylaniline | Reddish orange. |
| Do | 3, 7 - dihydroxytetrahydrobenzoquinoline. | Violet grey. |
| 3-amino-4-methoxybenzoic acid methylester | Dihydroxyethyl-m-toluidine | Reddish orange. |
| 3-nitro-4-aminobenzoic acid ethylester | 3, 7 - dihydroxytetrahydrobenzoquinoline. | Greenish blue. |
| 5-nitro-2-aminobenzoic acid-n-butyl-(or ethyl-)ester | Dihydroxyethyl-aniline | Saturated red. |
| Do | Dihydroxyethyl-m-toluidine | Bluish red. |
| p-Aminobenzoic acid ethylester | N-di-(β-methoxyethyl)-aniline | Orange. |
| Do | N-ethyl-β-acetohydroxy-ethyl-aniline | Do. |

The dyestuffs indicated in the table have good affinity for the fiber. All the dyeings obtained with them can be discharged to white.

We claim:

1. Water insoluble azodyestuffs of the general formula:

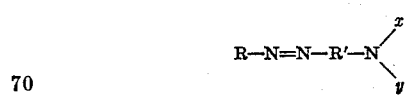

wherein R stands for the radical of a diazotized aromatic amine, bearing as substituent at least one esterified carboxylic acid group, and wherein R' stands for an aromatic radical, which has been coupled in para position to

$x$ stands for a member selected from the group consisting of mono- and polyhydroxyalkyl groups, etherified and esterified mono- and polyhydroxyalkyl groups, and such derivatives thereof, which are attached to R' in ortho-position to the nitrogen atom, and $y$ stands for a member selected from the group consisting of hydrogen, alkyl and hydroxyalkyl.

2. Water insoluble azodyestuffs of the general formula:

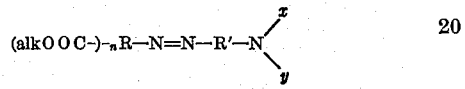

wherein alk stands for a member selected from the group consisting of alkyl and hydroxyalkyl, R stands for the radical of a diazotized aromatic amine, R' stands for an aromatic radical, which has been coupled in para position to

$x$ stands for hydroxyethyl, $y$ stands for a member selected from the group consisting of hydrogen, alkyl and hydroxyalkyl, and $n$ stands for one of the numbers 1 and 2.

3. Water insoluble azodyestuffs of the general formula:

(alkOOC-)$_n$R—N=N—R'—N(CH$_2$CH$_2$OH)$_2$ wherein alk stands for an alkyl group of at most four carbon atoms, R and R' stand for a radical of the benzene series and n stands for one of the numbers 1 and 2.
4. Water insoluble azodyestuffs of the general formula:
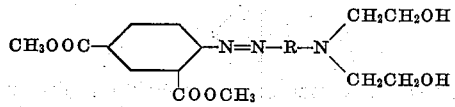
wherein R stands for a radical of the benzene series.
5. The dyestuff of the following formula:
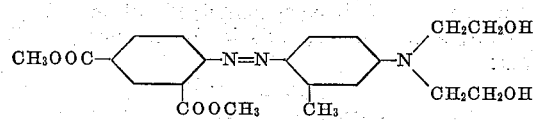
dyeing cellulose acetate silk reddish orange shades.
HELMUT KLEINER.
OTTO BAYER.
WILHELM KUNZE.